March 19, 1957  R. T. EATON  2,785,494
FISH POLE REST FOR NIGHT FISHING
Filed April 27, 1956
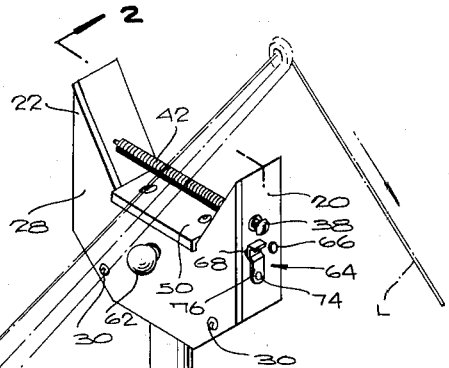
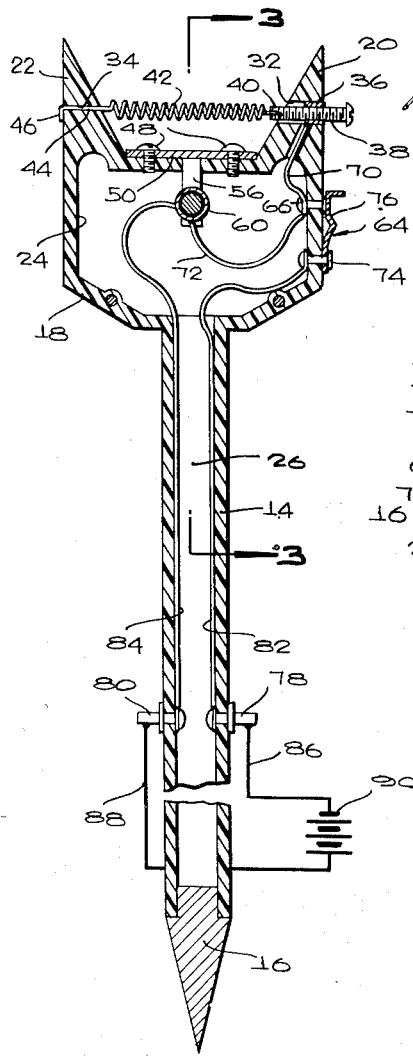
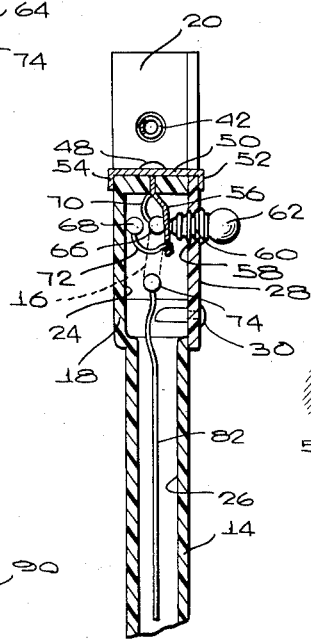
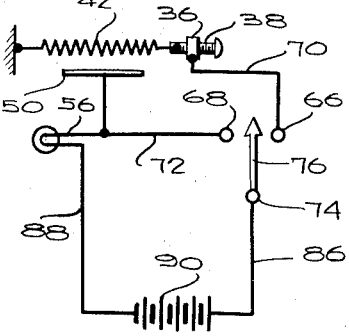
INVENTOR.
RICHARD T. EATON
BY
McMorrow, Berman & Davidson
ATTORNEYS

United States Patent Office 2,785,494
Patented Mar. 19, 1957

2,785,494

FISH POLE REST FOR NIGHT FISHING

Richard T. Eaton, Macedonia, Ohio

Application April 27, 1956, Serial No. 581,156

2 Claims. (Cl. 43—17)

This invention relates generally to fishing apparatus and is more particularly concerned with a novel fish pole rest especially usable during night fishing.

During night fishing when a fisherman utilizes a pole rest, unless the river bank is especially well lit it is extremely difficult for the fisherman to determine when he has a bite on his fish line. Often times it is difficult to locate the pole especially in dark locations and also extremely awkward and difficult to bait the fishhook.

The primary object of invention is to provide a novel fish pole rest which includes electric signal and service light means wherein the signal light means will be activated due to a bite on a fish line and the service light may be activated for the purpose of rebaiting a hook or the like.

A further object of invention in conformance with that set forth is to provide a novel fish pole rest which includes a body member having a leg portion insertable vertically into the ground and a pair of spaced upwardly extending arm portions, a tension spring element extending transversely between the arm portions and being of an electrical conducting material engageable with a contact plate disposed therebeneath, said tension spring element supporting thereon the weight of an overlying fish rod and being engageable with the contact plate due to the pressure exerted on the fish rod through a bite, a bulb member carried on the body member and in electrical contact with the contact plate, two-position switch means having spaced contact portions one of which being electrically connected to the contact plate, the other of which being electrically contacted to the tension spring element, a manually operated switch lever engageable with one or the other of the contact elements for closing a circuit thereto, and a source of potential in electrical contact with the contact plate and the switch element whereby engagement of the switch element with one contact element lights the bulb member, and engagement thereof with the other contact element completes a circuit to the tension spring element which will be activated upon engagement of the tension spring element with the contact plate.

A further object of invention in conformance with that set forth is to provide means for tensioning the tension spring element in a fish pole rest of the character set forth wherein fish poles of varying weight may be supported on said rest.

A still further object of invention in conformance with that set forth is to provide a novel fish pole rest of the character set forth which is readily and economically manufactured, easily used and installed, and highly satisfactory and acceptable for the purpose intended.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1 is a perspective view of the novel fish pole rest showing in phantom lines the relative position of a fish pole and line disposed transversely thereof;

Figure 2 is an enlarged sectional view taken substantially on line 2—2 of Figure 1, showing diagrammatically a source of potential connected to the fish pole rest;

Figure 3 is a fragmentary sectional view taken substantially on line 3—3 of Figure 2; and Figure 4 is a wiring diagram illustrating the manner in which the novel fish pole rest may be utilized either as an electric signal or service light.

Referring to the drawing in detail, the novel fish pole rest is indicated generally at 10 including a body member 12 constructed of any suitable material such as plastic, wood or the like, including a tubular leg portion 14 receiving in the bottom thereof a pointed element 16 of any suitable hardened material facilitating the insertion of the fish pole rest into the ground. The leg portion 14 is formed integral with an enlarged recessed portion 18 including a pair of spaced diverging arm portions 20 and 22, the diverging arm portions 20 and 22 serving as a guide for a fish pole assembly F which will extend in transverse overlying relationship relative to the space between said arms. Portion 18 includes an internal recess portion 24 in communication with the inner portion 26 of the leg portion of the fish pole rest and is enclosed by means of a suitable cover member 28 which overlies the recess 24, said cover plate 28 being secured to portion 18 by means of a suitable fastening element such as screws 30.

The legs 20 and 22 have extending transversely therethrough aligned bore portions 32 and 34, respectively, the bore portion 32 being of a larger diameter than bore portion 34 and having suitably secured therein an internally threaded sleeve element 36 of a suitable electrical conducting material which supports therein a transversely adjustable screw element 38, see Figure 2. The screw element 38 has extending transversely from the end 40 thereof one end of a tension spring element 42 constructed of any suitable material, the other end 44 of said tension spring element extending through the bore portion 34 of the leg 22 and being bent angularly at 46 for retaining the spring in a fixed position on said leg 22. The screw element 38 may be adjusted by means of a screw driver or suitable coin, for example, for providing a sufficient spring tension for accommodating fish poles of different weights thereon.

Secured in underlying relationship relative to the spring element 42 by means of fastening screws 48, for example, is an electrical contact plate 50 which may include side edge flange portions 52 and 54 which extend over opposite sides of portion 18 and cover member 28 of the fish pole rest thus serving to retain the cover plate in its position over the recess 24 of the fish pole rest. Thus when tension is applied to the fish line L in the direction indicated by the direction arrow, see Figure 1, the tension spring element 42 will engage the contact plate 50 thus closing a circuit to subsequently be described. The contact plate 50 includes an integral tab portion 56 disposed in spaced relationship from the cover plate 28, see Figure 3. The cover plate 28 has extending transversely therethrough in alignment with the tab 56 a threaded bore portion 58, see Figure 3, for accommodating therein the threaded base portion 60 of a light bulb member 62, the base 60 being in electrical contact with the tab 56. The bulb member 62, as subsequently will become apparent, will be available as a signal light when the tension spring element 42 contacts the contact plate 50, or can also be used as a service light to be constantly lit for the purpose of facilitating baiting of a hook, for example.

Indicated generally at 64 is a switch assembly which is manually actuated for the purpose of providing either a signal or service light as desired. The switch assembly 64 includes a pair of spaced contact elements 66 and 68 suitably secured and extending into the recess 24 of the portion 18 of the fish pole rest. Contact element 66 will be electrically connected to a suitable conducting wire 70 to the sleeve element 36 previously described. The contact element 68, see Figure 3, will be electrically connected to a suitable electrical conducting wire 72 to the tab portion 56 of the contact plate 50. Suitably secured in spaced relationship from the contact elements 66 and 68 is a contact element 74 which extends through the portion 18 of the fish pole rest which pivotally supports thereon an electrically conducting switch lever element 76 which is optionally engageable with the contact element 66 or 68.

The leg portion 14 of the fish pole rest has extending from opposite sides thereof electrical terminal elements 78 and 80 which have connected thereto suitable electrical conducting wires 82 and 84, respectively wire 82 being connected to the contact element 74, and the conducting wire 84 being operatively connected to the side of the base 60 for the bulb 62, as in Figure 2. The terminals 78 and 80 are respectively connected to conducting wires 86 and 88 which in turn are suitably connected to the terminals of a suitable source of potential such as an automobile battery indicated at 90.

Thus, as most clearly shown diagrammatically in Figure 4, when the switch lever 76 is in engagement with the contact element 66 the tension of a bite on the fish line L results in the tension spring element 42 engaging the contact plate 50 thus closing or completing a circuit to the bulb member 62 which will light up and apprise the fisherman of such bite. When it is desired to utilize the bulb member 62 as a service light, the switch lever 76 is placed in engagement with the contact element 68 closing a circuit to the bulb member 62 whereafter the bulb member 62 will be constantly lit.

Thus there has been disclosed a novel fish pole rest which fully conforms with the objects of invention heretofore set forth.

Various positional directional terms such as "inner," "outer," etc. are utilized herein to have only a relative connotation to aid in describing the device and it is not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the appended claims.

What is claimed is:

1. A fish pole rest for providing an electric signal and service light comprising a body member including a leg portion insertable vertically into the ground and spaced upper arm portions, a tension spring element of an electrical conducting material supported transversely between and connected to the arm portions for supporting the weight of an overlying fish rod thereon, an electrical contact plate on the body member beneath the spring element for engagement therewith for closing an electrical circuit, a bulb member carried on the body member in electric contact with said contact plate, a two-position switch assembly on the body member including a pair of spaced electrical contact elements, one contact element being electrically connected to the contact plate, the other of which being electrically connected to said tension spring element, a manually operated switch lever element on said body member electrically engageable with one or the other of said contact elements, and a source of potential electrically connected to said contact plate and switch element in such a manner that engagement of the switch element with one contact element lights the bulb member, and engagement thereof with the other contact element permits the bulb member to be lit when the tension spring element engages the contact plate.

2. A fish pole rest for providing an electric signal and service light comprising a body member including a leg portion insertable vertically into the ground and spaced upper arm portions, a tension spring element of an electrical conducting material supported transversely between and connected to the arm portions for supporting the weight of an overlying fish rod thereon, an electrical contact plate on the body member beneath the spring element for engagement therewith for closing an electrical circuit, a bulb member carried on the body member in electric contact with said contact plate, a two-position switch assembly on the body member including a pair of spaced electrical contact elements, one contact element being electrically connected to the contact plate, the other of which being electrically connected to said tension spring element, a manually operated switch lever element on said body member electrically engageable with one or the other of said contact elements, and a source of potential electrically connected to said contact plate and switch element in such a manner that engagement of the switch element with one contact element lights the bulb member, and engagement thereof with the other contact element permits the bulb member to be lit when the tension spring element engages the contact plate, one of said arm portions including a transverse bore portion therethrough, an internally threaded sleeve element disposed in the bore portion, the sleeve element being electrically connected to the other contact element, and a transversely adjustable screw disposed in the sleeve element secured to the tension spring element for adjusting the tension spring whereby fish poles of varying weights may be accommodated on the fish pole rest.

References Cited in the file of this patent

UNITED STATES PATENTS

| | | |
|---|---|---|
| 1,057,879 | Quain | Apr. 1, 1913 |
| 2,549,694 | Leyda | Apr. 17, 1951 |
| 2,651,689 | Bame | Sept. 8, 1953 |
| 2,753,644 | Abel | July 10, 1956 |